(No Model.)
J. NUTTALL.
PIPE COUPLING.
No. 304,276. Patented Aug. 26, 1884.
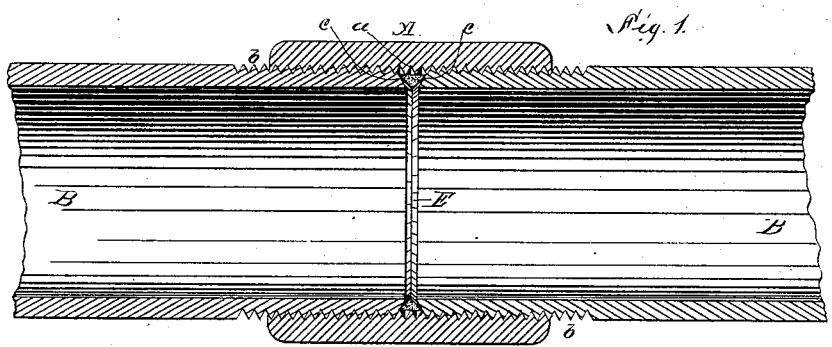
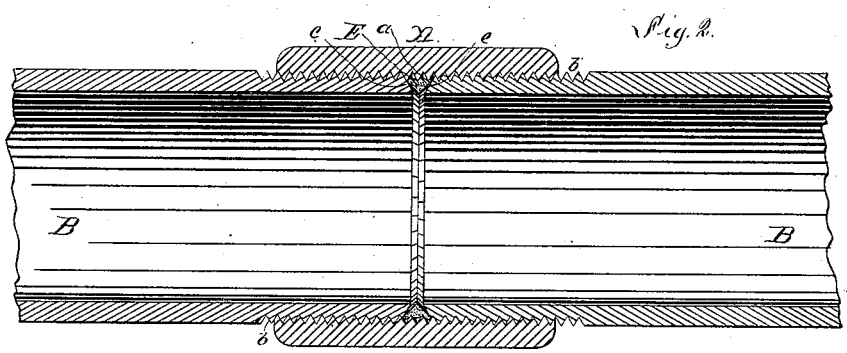
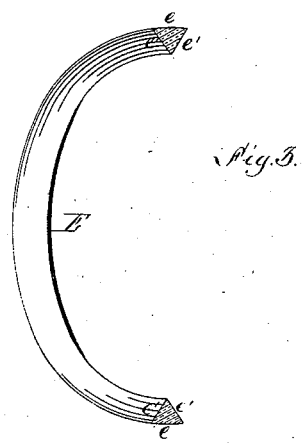

UNITED STATES PATENT OFFICE.

JOSHUA NUTTALL, OF PITTSBURG, PENNSYLVANIA.

PIPE-COUPLING.

SPECIFICATION forming part of Letters Patent No. 304,276, dated August 26, 1884.

Application filed April 23, 1883. (No model.)

*To all whom it may concern:*

Be it known that I, JOSHUA NUTTALL, a citizen of the United States, residing at Pittsburg, county of Allegheny, State of Pennsylvania, have invented or discovered a new and useful Improvement in Pipe-Couplings; and I do hereby declare the following to be a full, clear, concise, and exact description thereof, reference being had to the accompanying drawings, making a part of this specification, in which—like letters indicating like parts—

Figure 1 is a longitudinal sectional view of a pipe-coupling illustrative of my invention, showing the parts in place ready to be tightened. Fig. 2 is a similar view showing the parts partially tightened up, and illustrating the effect of such tightening upon the packing-ring; and Fig. 3 is a sectional perspective view to an enlarged scale of the metal packing-ring.

My invention relates to certain improvements in pipe-couplings; and, in general terms, it consists of certain combinations of a threaded sleeve or socket, threaded pipes having beveled or tapered ends, forming a dovetail or similarly-shaped groove or opening between their abutting ends when screwed into the socket, and a packing-ring of soft ductile metal compressed between the beveled pipe ends and the socket-wall, as hereinafter more fully described and claimed.

In laying wrought-iron pipe for conducting so-called "natural gas" it has been found very difficult to secure gas-tight connections between pipe-sections. Connections which are water-tight under comparatively high pressure will frequently permit escape of natural gas in greater or less quantities, usually so small that it is of little moment, and may be neglected when loss from waste is alone considered, as in rural districts, where this gas abounds; but in utilizing such gas in cities and towns even a small leakage or escape is liable to become offensive and deleterious.

The purpose of my invention is to provide a cheap and convenient coupling, which shall effectually prevent escape of gas, and thereby remove what has heretofore been a serious obstacle in the way of using natural gas in towns and cities.

In the drawings, A represents an ordinary sleeve-coupling, threaded on its inner surface, as at $a$, to receive the correspondingly-threaded portions $b$ of the pipe-sections B. The points or extremities of these pipe-sections are beveled backward toward the outer surface, as at $c$, so that when screwed into the sleeve or socket A an annular groove or opening is formed between pipe ends of dovetail form, or of increasing width toward the surrounding surface of the socket. Within this annular opening or space is a gasket or packing-ring, E, of lead, copper, or other equivalent soft ductile metal or alloy. The form of the packing-ring in cross-section is by preference triangular, having a flat or nearly flat base or periphery, $e$, and inwardly-converging sides $e'$, corresponding approximately to the form of opening between the pipe ends.

In Fig. 1 the packing-ring is shown in position between the pipe ends preparatory to being clamped and expanded by screwing up the pipes tight, the gasket or ring being so placed before one or both pipes are screwed in. On screwing up the pipes, their beveled ends $c$, bearing upon the sloping sides $e'$ of the packing-ring, expand or crowd the ring outward against and into the threads $a$, thereby filling them and the space between pipe ends more or less tightly, depending upon the force with which the pipes are screwed up. In Fig. 2 I have illustrated in part this expanding action upon the packing, the periphery $e$ of the ring being shown compressed somewhat into the thread-grooves. This is designed simply as an illustration of the effect of the first stages of compression, and not as the final form assumed under tight compression. In the use particularly in view the packing-ring is by preference so compressed as to fill tightly the groove or space, and thereby making a tight seal and effectually preventing escape of gas. This tight packing is secured principally by the expanding force due to the action upon each other of the inclined faces $c$ and $e'$, and as a result of it compression is secured not only between the abutting pipe ends $c$, but also between these ends and the threaded socket-wall. With square or parallel faced pipe ends compression would be secured only between such ends, with a marked tendency under rotation in screwing up to work the gasket or packing-ring inward, thereby rendering it difficult to secure a perfectly-tight joint.

In my improved coupling there is a direct and positive expanding force exerted upon the ring which is equal, or nearly equal, to the compressing force directly between pipe ends. This action will be secured, to a greater or less degree, if the sides $e'$ of the packing-ring are made nearly or quite parallel, especially when the bevel $c$ is considerable, since the action of these inclines will crowd the ring outward against the threaded wall $a$. I consider it, therefore, within my invention to use, in connection with the beveled pipe ends $c$, a soft-metal packing-ring of other forms than that shown—round or rectangular in cross-section, for example—though I prefer the triangular form of ring shown, as best adapted to secure the expanding action above described.

I claim herein as my invention—

1. A pipe-coupling having in combination an interiorly-threaded sleeve-socket, A, threaded pipe-sections B, having ends $c$, beveled upon their outer surface, and a packing-ring of soft metal or equivalent alloy compressed by expansion between the abutting beveled ends $c$ and the inner wall of the socket, substantially as and for the purposes set forth.

2. The combination of socket A, threaded pipe-sections B, having ends $c$ beveled on their outer surface, and soft-metal packing-ring E, having inwardly sloping or converging sides $e'$, substantially as and for the purposes set forth.

In testimony whereof I have hereunto set my hand.

JOSHUA NUTTALL.

Witnesses:
R. H. WHITTLESEY,
C. L. PARKER.